United States Patent [19]
Hagiwara et al.

[11] Patent Number: 5,079,423
[45] Date of Patent: Jan. 7, 1992

[54] X-RAY IMAGE SENSOR

[75] Inventors: Ryoji Hagiwara; Hiroyuki Suzuki, both of Tokyo, Japan

[73] Assignee: Seiko Instruments Inc., Japan

[21] Appl. No.: 510,290

[22] Filed: Apr. 16, 1990

[30] Foreign Application Priority Data

Apr. 18, 1989 [JP] Japan .................... 1-98538

[51] Int. Cl.$^5$ .............................................. G01T 1/20
[52] U.S. Cl. ................... 250/368; 250/370.11; 250/483.1
[58] Field of Search ............... 250/370.11, 486.1, 368, 250/483.1; 252/301.4 R

[56] References Cited

U.S. PATENT DOCUMENTS

| | | | |
|---|---|---|---|
| 4,499,159 | 2/1985 | Brines et al. | 250/483.1 |
| 4,694,177 | 9/1987 | Akai et al. | 250/368 |
| 4,740,975 | 4/1988 | Abrahams et al. | 372/41 |
| 4,804,514 | 2/1989 | Bartko et al. | 376/154 |
| 4,906,893 | 3/1990 | Homma et al. | 250/486.1 |
| 4,910,405 | 3/1990 | Suzuki et al. | 250/368 |
| 4,982,096 | 1/1991 | Fujii et al. | 250/367 |

FOREIGN PATENT DOCUMENTS

| | | | |
|---|---|---|---|
| 1439096 | 10/1968 | Fed. Rep. of Germany | 250/213 |
| 57-50674 | 7/1982 | Japan . | |
| 58-75083 | 7/1983 | Japan . | |
| 59-122988 | 7/1984 | Japan . | |
| 0318986 | 12/1989 | Japan | 250/370.11 |

Primary Examiner—Carolyn E. Fields
Assistant Examiner—James E. Beyer
Attorney, Agent, or Firm—Bruce L. Adams; Van C. Wilks

[57] ABSTRACT

In an X-ray image sensor wherein a fiber optic plate having formed thereon a phosphor layer is fitted to and integrated with a solid state imaging device. The present invention relates to an X-ray image sensor using, as the phosphor material, a material to which neodymium (Nd) having a light emission band outside the wavelength range that is absorbed and decreased by coloring damage generated by X-rays is added.

17 Claims, 1 Drawing Sheet

X-RAY IMAGE SENSOR

BACKGROUND OF THE INVENTION

This invention relates to an X-ray image sensor used for industrial and remedial purposes.

A known X-ray image sensor utilizing a solid state imaging device uses a phosphor having a light emission range near 500 nm for a phosphor layer.

In the conventional X-ray image sensor utilizing the phosphor having its light emission range near 500 nm, the thickness of the phosphor layer must be great for sufficiently absorbing the X-rays in order to prevent coloring damage of the fiber optic plate. Since ordinary transmission inspection apparatuses use X-rays of from 10 to 100 KeV, this thickness is at least one millimeter. At this time the image which changes from the X-rays to visible rays diffuses in the phosphor layer and there occurs the problem that resolution drops below 51 p/mm.

To form the phosphor layer in a thin film and to improve resolution, a system has been proposed which adds cerium oxide to the fiber plate so as to prevent coloration but this system is not free from the problem that the production cost becomes high because cerium oxide must be specifically added.

OBJECTS OF THE INVENTION

To solve the problem described above, the present invention comprises a solid state imaging device, a fiber optic plate and a phosphor layer containing neodymium (Nd), and at least one member selected from the group consisting of $Gd_3Ga_5O_{12}$ (hereinafter called "GGG"), $Gd_3Sc_2Ga_3O_{12}$ (hereinafter called "GSGG"), $Gd_3Sc_2Al_3O_{12}$ (hereinafter called "GSAG"), $Gd_3Ga_2Al_3O_{12}$ (hereinafter called "GGAG") and $La_3Lu_2Ga_3O_{12}$ (hereinafter called "LLGG") is used as the base material of the phosphor layer.

Coloring damage of the fiber optic plate by the X-rays remarkably absorbs the rays of light below 800 nm, but the rays of light above 800 nm are not absorbed by the coloring damage. The sensitivity range of a silicon type solid state imaging device is about ±300 nm from 800 nm being the center. From this, long time imaging can be made even by use of an X-ray image sensor consisting of a fiber plate not having cerium oxide added thereto and a thin phosphor layer as thin as about some dozens of microns by use of a phosphor using neodymium (Nd) having a light emission range at 1,064 nm.

Here, in order to prevent the X-rays passing through the fiber optic plate from being incident into the solid state imaging device, it is preferred to add at least one metal oxide selected from the group consisting of cerium oxide, lanthanum oxide and lead oxide to the fiber optic plate.

DETAILED DESCRIPTION

Next, an embodiment of the present invention will be explained with reference to the drawings.

As the first embodiment of the present invention, an embodiment wherein a radiation shielding material is used for the fiber optic plate will be explained with reference to the drawings.

Figure 1:
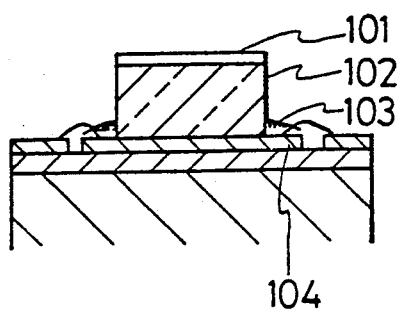
FIG. 1 is a sectional view showing an X-ray image sensor in accordance with the first embodiment of the present invention.

FIG. 1 is a sectional view showing the X-ray image sensor in accordance with one embodiment of the present invention. The structure will be explained with reference to this drawing. A fiber optic plate (102) is tightly bonded onto an image input surface (104) of a silicon type solid state imaging device by use of an optical adhesive (103). Further, a phosphor layer (101) is formed on and integrated with the fiber optic plate (102) to produce the X-ray image sensor.

The fiber optic plate (102) and the phosphor layer (101) in this X-ray image sensor are subjected to the following treatment.

Lead oxide is added to the fiber optic plate (102) in order to prevent the X-ray passing through the fiber optic plate (102) from entering the solid state imaging device.

Figure 2:
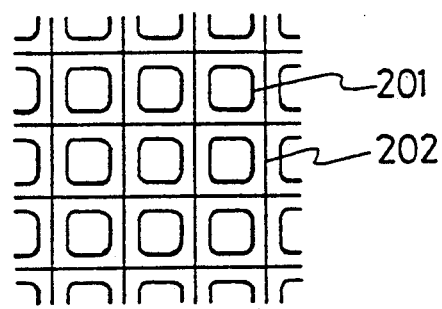
FIG. 2 is a plan view showing the surface condition of a phosphor layer in the first embodiment.
Figure 3:
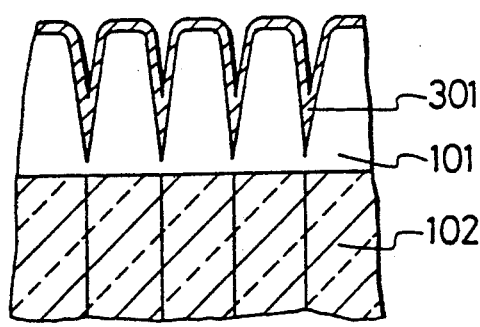
FIG. 3 is a sectional view showing the sectional condition of the phosphor layer in the first embodiment.

The phosphor layer (101) is molded in a uniform thickness of 20±3 microns by adding a binder to a powder of GGG to which 2 wt% of neodymium is doped. In order to improve resolution, square portions (201) and groove portions (202) are formed in grid form on the surface of the phosphor layer (101) as shown in FIG. 2 to suppress bleeding of the image due to expansion of the emitted rays of light. Further, in order to suppress the drop of brightness due to dissipation of the emitted rays of light, the surface of the phosphor layer (101) is covered with 0.01 to 0.1 micron-thick aluminum metal back (301).

The X-ray image sensor completed by the structure described above can obtain a life of at least 10,000 hours without conducting coloration prevention processing that has been necessary conventionally.

In the second embodiment, the X-ray image sensor is produced in the same way as in the first embodiment by adding a binder to a powder of the GSAG crystal to which 1 wt% of neodymium is added as the phosphor material and forming a 10 μ-thick phosphor layer (101).

Here, barium oxide is added to the fiber optic plate (101) for shielding the X-rays.

The X-ray image sensor thus completed can obtain a life of at least 10,000 hours without the conventional coloration prevention processing.

In the third embodiment, the X-ray image sensor is produced in the same way as in the first embodiment by adding a binder to a powder of the GGAG crystal to which 4 wt% of neodymium is added as the phosphor material and forming a 10 micron-thick phosphor layer (101).

Here, lanthanum oxide is added to the fiber optic plate (101) for shielding the X-rays.

The X-ray image sensor thus completed can obtain life of at least 10,000 hours without the conventional coloration prevention processing.

In the fourth embodiment, the X-ray image sensor is produced in the same way as in the first embodiment by adding a binder to a powder of the LLGG crystal to which 3 wt% of neodymium is added as the phosphor material and forming a 20 micron-thick phosphor layer (101).

Here, lead oxide and barium oxide are added to the fiber optic plate (101) for shielding the X-rays.

The X-ray image sensor thus completed can obtain a life of at least 10,000 hours without the conventional coloration prevention processing.

Figure 4:
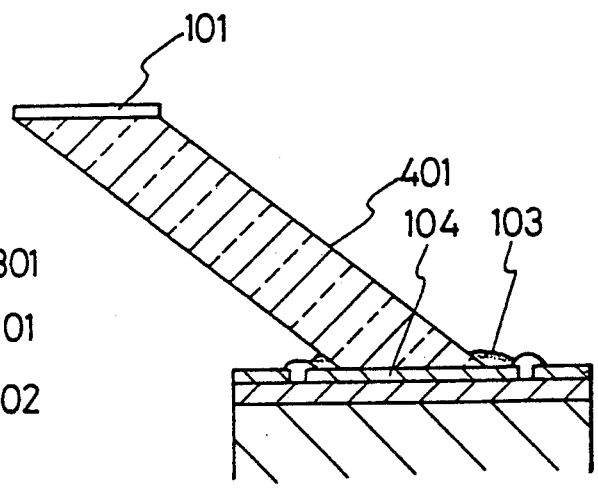
FIG. 4 is a sectional view showing the X-ray image sensor in accordance with another embodiment of the present invention.

The fifth embodiment of the present invention will be explained with reference to FIG. 4.

The structure is substantially the same as that of the first embodiment. However, the radiation shielding material such as lead oxide, barium oxide or the like is not added to the fiber optic plate (401). Therefore, this embodiment employs the structure wherein the X-ray reception surface of the phosphor layer and the visible ray reception surface of the solid state imaging device are deviated from each other in order to prevent the X-rays passing through the fiber optic plate (401) from being incident onto the image input surface of the solid state imaging device.

The X-ray image sensor is produced by adding a binder to GSGG powder, to which 2 wt% of neodymium is added, as the phosphor material and forming a 30 micron-thick phosphor layer.

The X-ray image sensor thus completed can obtain life of at least 10,000 hours without applying the coloration prevention treatment or the radiation shielding treatment to the fiber optic plate (401).

Incidentally, the shape of the fiber optic plate (401) may be other shapes than the shape described above so long as they prevent the X-ray from being incident to the visible ray reception surface of the solid state imaging device.

The present invention can obtain economically an X-ray image sensor which provides a 10~30 $\mu$ stable image without the coloration prevention processing of the fiber optic plate.

What is claimed is:

1. An x-ray image sensor, comprising: a fiber optic plate having an x-ray incidence side and an other side; a phosphor screen member containing neodymium (Nd) disposed on the x-ray incidence side of said fiber optic plate; and a silicon type solid state image sensing device optically coupled to the other side of said fiber optic plate; wherein said phosphor screen member includes at least one member selected from the group consisting of GGG ($GD_3GA_5O_{12}$), GSGG ($Gd_3Sc_2Ga_3O_{12}$), GSAG ($GD_3Sc_2Al_3O_{12}$), GGAG ($Gd_3Ga_2Al_3O_{12}$), and LLGG ($La_3Lu_2Ga_3O_{12}$).

2. An x-ray image sensor according to claim 1, wherein said phosphor screen member has an x-ray incidence surface; and a metal film member covering the surface.

3. An x-ray image sensor according to claim 2, wherein said metal film member is composed of aluminum.

4. An x-ray image sensor according to claim 2, wherein said metal film member has a thickness greater than 0.01 micron.

5. An x-ray image sensor according to claim 2, wherein said metal film member has a thickness less than 0.1 micron.

6. An x-ray image sensor comprising: a phosphor screen member for converting incident x-ray radiation into light radiation; a fiber optic plate having an input side disposed to receive light radiation transmitted by said phosphor screen member and some x-ray radiation transmitted by said phosphor screen member and an output side for exiting light radiation propagated through said fiber optic plate; and an image sensing device optically coupled to the output side of said fiber optic plate wherein said phosphor screen member includes a sufficient amount of neodymium to bring the light emission range of said phosphor screen member above the range of light absorbed by coloring damage caused by the x-rays.

7. An x-ray image sensor according to claim 6, wherein said phosphor screen member includes at least one member selected from the group consisting of GGG ($GD_3GA_5O_{12}$), GSGG ($Gd_3Sc_2Ga_3O_{12}$), GSAG ($GD_3Sc_2Al_3O_{12}$), GGAG ($Gd_3Ga_2Al_3O_{12}$), and LLGG ($La_3Lu_2Ga_3O_{12}$).

8. An x-ray image sensor according to claim 7, wherein said fiber optic plate has a core material that includes at least one member selected from the group consisting of lead oxide, barium oxide, and lanthanum oxide.

9. An x-ray image sensor according to claim 6, wherein said image sensing device includes a silicon type solid state image sensing device.

10. An x-ray image sensor according to claim 9, wherein the silicon type solid state image sensing device is receptive of light having a wavelength between 500 and 1100 nm.

11. An x-ray image sensor according to claim 6, wherein said phosphor screen member has an x-ray incidence surface; and a metal film member covering the surface.

12. An x-ray image sensor according to claim 11, wherein said metal film member is composed of aluminum.

13. An x-ray image sensor according to claim 6, wherein said metal film member has a thickness that is greater than 0.01 micron.

14. An x-ray image sensor according to claim 6, wherein said metal film member has a thickness that is less than 0.1 micron.

15. An x-ray image sensor according to claim 6, wherein said phosphor screen member has a surface having a grid comprised of raised portions and groove portions for improving image resolution.

16. An x-ray image sensor according to claim 6, wherein said phosphor screen member is positioned relative to said image sensing device such that an x-ray incident on said phosphor screen member is not incident on said image sensing device.

17. An x-ray image sensor according to claim 6, wherein said fiber optic plate has an optical axis inclined to said phosphor screen member.

* * * * *